United States Patent [19]

Moritz et al.

[11] Patent Number: 5,400,598
[45] Date of Patent: Mar. 28, 1995

[54] METHOD AND APPARATUS FOR PRODUCING POWER FROM TWO-PHASE GEOTHERMAL FLUID

[75] Inventors: Alex Moritz, Holon; Moshe Grassianni, Herzlyia, both of Israel

[73] Assignee: Ormat Industries Ltd., Yavne, Israel

[21] Appl. No.: 58,756

[22] Filed: May 10, 1993

[51] Int. Cl.⁶ ............................................. F03G 7/00
[52] U.S. Cl. ............................... 60/641.2; 60/651; 60/671
[58] Field of Search ............... 60/641.2, 641.4, 641.3, 60/651, 671

[56] References Cited

U.S. PATENT DOCUMENTS

| | | | |
|---|---|---|---|
| 4,102,133 | 7/1978 | Anderson | 60/641.2 |
| 4,358,930 | 11/1982 | Pope et al. | 60/641.2 X |
| 5,038,567 | 8/1991 | Mortiz | 60/641.5 |
| 5,190,664 | 3/1993 | Gallup et al. | 60/641.2 X |

FOREIGN PATENT DOCUMENTS

| | | | |
|---|---|---|---|
| 0042752 | 12/1981 | European Pat. Off. | |
| 0088878 | 5/1985 | Japan | 60/641.2 |

*Primary Examiner*—Stephen F. Husar
*Attorney, Agent, or Firm*—Sandler, Greenblum & Bernstein

[57] ABSTRACT

Power is generated from a two-phase geothermal fluid containing a substantial amount of non-condensable gases, typically not less than about 3% by extracting a geothermal fluid from the ground under its own pressure, and passing the extracted geothermal fluid through an indirect heat exchange device containing an organic fluid for vaporizing the latter and producing vaporized organic fluid and heat depleted geothermal fluid. The vaporized organic fluid is expanded in a turbine coupled to a generator for producing power and expanded vaporized organic fluid which is condensed to a liquid and returned to the indirect heat exchange device. Finally, the heat depleted geothermal fluid may be returned to the ground via a rejection well.

8 Claims, 3 Drawing Sheets $Q_2 = Q_1$
$T_{B2} > T_{B1}$ $Q_3 > Q_1$
$T_{B3} = T_{B1}$

METHOD AND APPARATUS FOR PRODUCING POWER FROM TWO-PHASE GEOTHERMAL FLUID

TECHNICAL FIELD

This invention relates to a method of and apparatus for producing power from two-phase geothermal fluid, and more particularly, from a two-phase geothermal fluid containing a substantial amount of non-condensable gases wherein power is produced using one or more indirect, binary cycle systems (i.e., wherein the geothermal fluid is used to indirectly heat a secondary fluid such as an organic fluid).

BACKGROUND OF THE INVENTION

The need for alternatives to fossil fuels for power production using an indirect (i.e., binary cycle) system is well known; and geothermal resources represent a promising solution. Geothermal fields are known that produce two-phase geothermal fluid in the form of high pressure steam and hot brine. In some fields, the underground pressure of this fluid is high enough to effect the passage of fluid from a source deep in the ground to the surface.

The usual approach to harnessing this fluid for power production using an indirect (binary cycle) system is to apply the geothermal fluid to a separator that separates the fluid into a steam component and a hot brine component. Heat is extracted from each component, and the heat depleted fluid is then returned to the ground though an re-injection well.

In one type of installation, the steam component is passed through an indirect heat exchanger containing an organic liquid that has been preheated by the brine component causing the organic liquid to be vaporized. The heat depleted steam component, and the heat depleted brine component are then combined and injected into the ground so as to prevent escape into the environment of any deleterious gases in the geothermal fluid. This type of installation is disclosed in U.S. Pat. No. 5,038,567 and in copending application Ser. No. 07/952,156, filed Sep. 28, 1992 (which is a continuation of application Ser. No 07/658,303 filed Feb. 20, 1991, now abandoned, the disclosures of all of which are hereby incorporated by reference.

The vaporized organic fluid is applied to an organic vapor turbine wherein expansion takes place causing a generator coupled to the turbine to generate power, and producing expanded, organic vapor. A condenser condenses the expanded organic vapor, and a pump returns the condensed organic fluid to the heat exchanger completing the cycle.

In installations like this, an inconvenience arises when the geothermal fluid contains a great deal of non-condensable gases. Provision must be made to extract these gases from the heat exchanger in which steam condensation takes place, namely the heat exchanger that acts as a vaporizer for the organic fluid. Failure to remove non-condensables on a regular basis will result in decreased heat transfer efficiency and an eventual halt in operations.

Conventionally, the problem is solved by extracting the non-condensables, pressurizing them, and optionally returning them to the ground with the heat depleted steam and brine. However, a considerable amount of power is required for this operation thus reducing the net power available from the power plant installation.

In addition, one of the limitations of producing power from two-phase geothermal fluid is the value of the temperature to which the geothermal fluid can be cooled. As the temperature to which the geothermal fluid can be cooled decreases, and the power output increases, some dissolved solids (such as silica) may precipitate. In the conventional approach described above, separating the steam from the brine concentrates the remaining brine and changes its pH further aggravating the problem of precipitation in the separated brine.

It is therefore an object of the present invention to provide a new and improved method and apparatus for producing power from two-phase geothermal fluid containing a substantial (e.g., above about 3%) amount of non-condensable gases, which produces more power and is simpler to construct and to maintain.

BRIEF DESCRIPTION OF THE INVENTION

According to the present invention, power is generated from a two-phase geothermal fluid containing a substantial amount of non-condensable gases, typically above about 3%, by extracting a geothermal fluid from the ground under its own pressure, and passing the extracted, unseparated geothermal fluid through an indirect heat exchange means containing an organic fluid for vaporizing the latter and producing vaporized organic fluid and heat depleted geothermal fluid. The vaporized organic fluid is expanded in a turbine coupled to a generator for producing power and expanded vaporized organic fluid which is condensed to a liquid and returned to the indirect heat exchange means. Usually, the heat depleted geothermal fluid is returned to the ground via an re-injection well.

In addition to design simplicity, the present invention has a number of advantages over installations in which the geothermal fluid in separated into steam and brine components for separate processing. First, the present invention permits more work to be extracted from the geothermal fluid under the same operating conditions either by increasing the thermodynamic efficiency for a given amount of available heat, or by increasing the amount of heat that is utilized which is achieved by lowering the temperature to which the geothermal fluid is cooled in a binary cycle, or by a combination of these approaches. Second, by maintaining the pressure of the two-phase fluid at a substantially constant level while simultaneously cooling it without separating the fluid into its two components in a binary cycle system, non-condensable gas redissolution is enhanced. Thus, the possibility of scale (e.g., silica, carbonates, etc.) precipitation is reduced such that the geothermal fluid exiting the binary cycle system can be cooled to a lower temperature compared to a system where the two phases of the geothermal fluid are separated. By simultaneously preventing the geothermal fluid from separating, and cooling it, a dilution effect is achieved. The resultant liquid phase after cooling has a lower salt concentration compared to a brine in a system where steam is separated from the brine. Moreover, by achieving enhanced non-condensable gas redissolution, the pH of the fluid is slightly lowered further reducing the possibility of scale precipitation in addition to the above mentioned dilution effect. As a result, the possibility of scale precipitation is reduced, and a lower temperature of the geothermal fluid exiting the binary cycle system can be achieved. Consequently, more heat can be extracted from the fluid.

BRIEF DESCRIPTION OF THE DRAWINGS

An embodiment of the present invention is described by way of example and shown in the accompanying drawings wherein.

DETAILED DESCRIPTION

Figure 1:
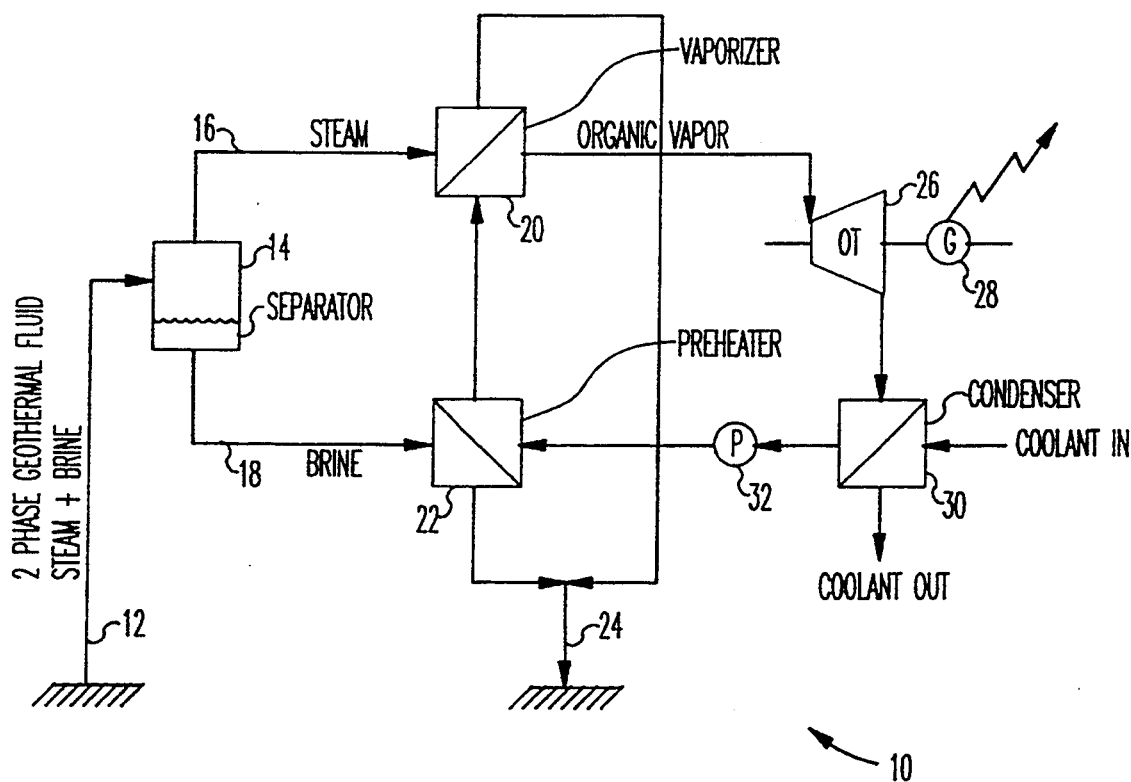
FIG. 1 is a block diagram of a first conventional power plant for generating power from a two-phase high pressure geothermal source.

Referring now to FIG. 1 of the drawings, reference numeral 10 designates a conventional apparatus for producing power from a two-phase geothermal fluid. The geothermal fluid is supplied from production well 12 which typically produces geothermal fluid having a mixture of saturated steam and concentrated brine. Typically, the fluid flows from the underground source to the surface under its own pressure. In many instances, the geothermal fluid contains a great deal of dissolved minerals including silicates which precipitate out as the temperature and pressure of the fluid drops.

The geothermal fluid supplied by well 12 is fed to separator 14 which separates the fluid into steam component 16 and hot brine component 18. Heat is extracted from each component in separate heat exchangers, and the heat depleted fluid is then returned to the ground though an re-injection well.

Specifically, steam component 16 is passed through indirect heat exchanger 20 which functions as a vaporizer for an organic liquid contained therein causing vaporization of the organic liquid which has been preheated by brine component 18 in heat exchanger 22. The heat depleted steam component, and the heat depleted brine component are then combined and injected into the ground at 24 so as to prevent escape into the environment of any deleterious non-condensable gases in the geothermal fluid.

The vaporized organic fluid produced by heat exchanger 20 is applied to organic vapor turbine 26 wherein expansion takes place causing generator 28 coupled to the turbine to generate power, and producing expanded, organic vapor. Condenser 30 condenses the expanded organic vapor, and pump 32 returns the condensate to preheater 22 completing the cycle. This type of installation is described in detail in U.S. Pat. No. 5.038,567, and in copending application Ser. No. 07/952,156, filed Sep. 28, 1992.

Figure 2:
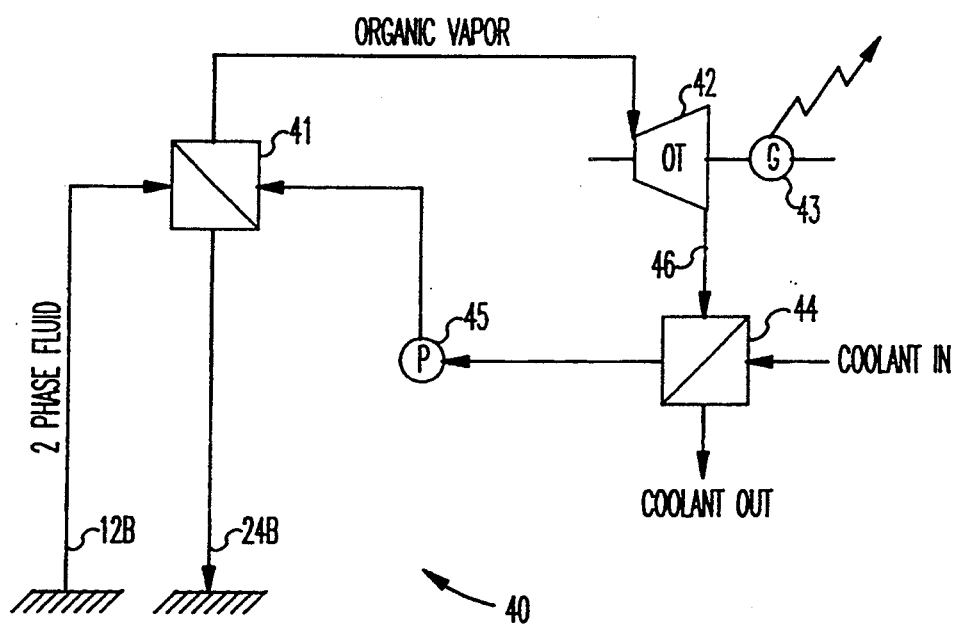
FIG. 2 is a block diagram of a power plant according to the present invention.

Apparatus according to the present invention is designated by reference numeral 40 in FIG. 2. Two phase geothermal fluid under its internal pressure issues from production well 12B, the fluid comprising a mixture of steam, brine, and a substantial amount of non-condensable gases, typically, in an amount not less than about 3%. The fluid also contains dissolved minerals, particularly silicates that tend to precipitate when the temperature and pressure of the brine decreases.

Figure 2A:
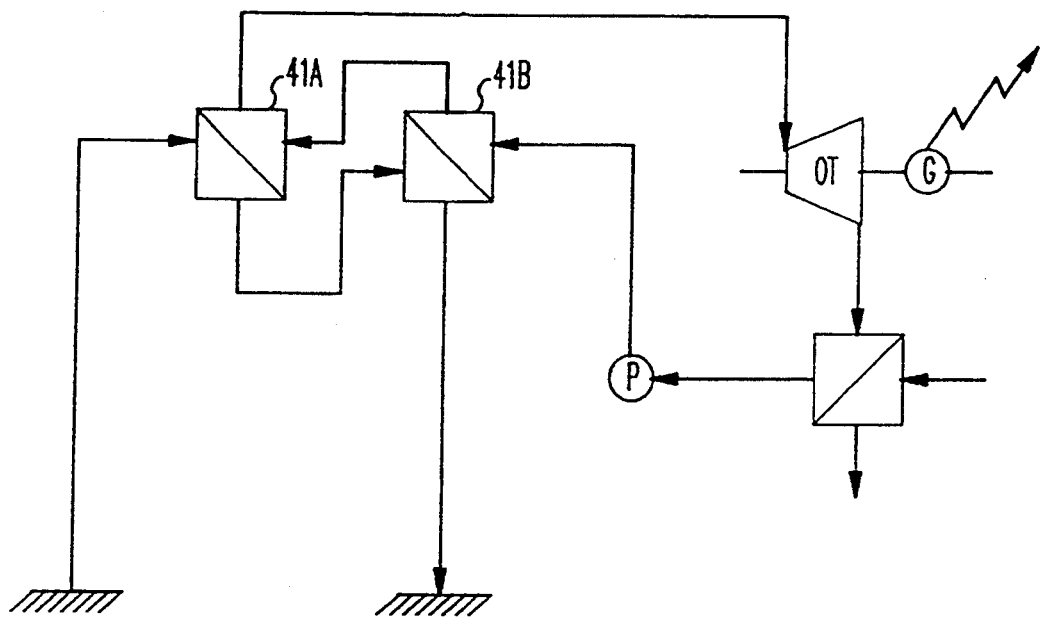
FIG. 2A is a block diagram showing an embodiment of the present invention in which the heat exchange means comprises a plurality of indirect heat exchangers connected in series.
Figure 2B:
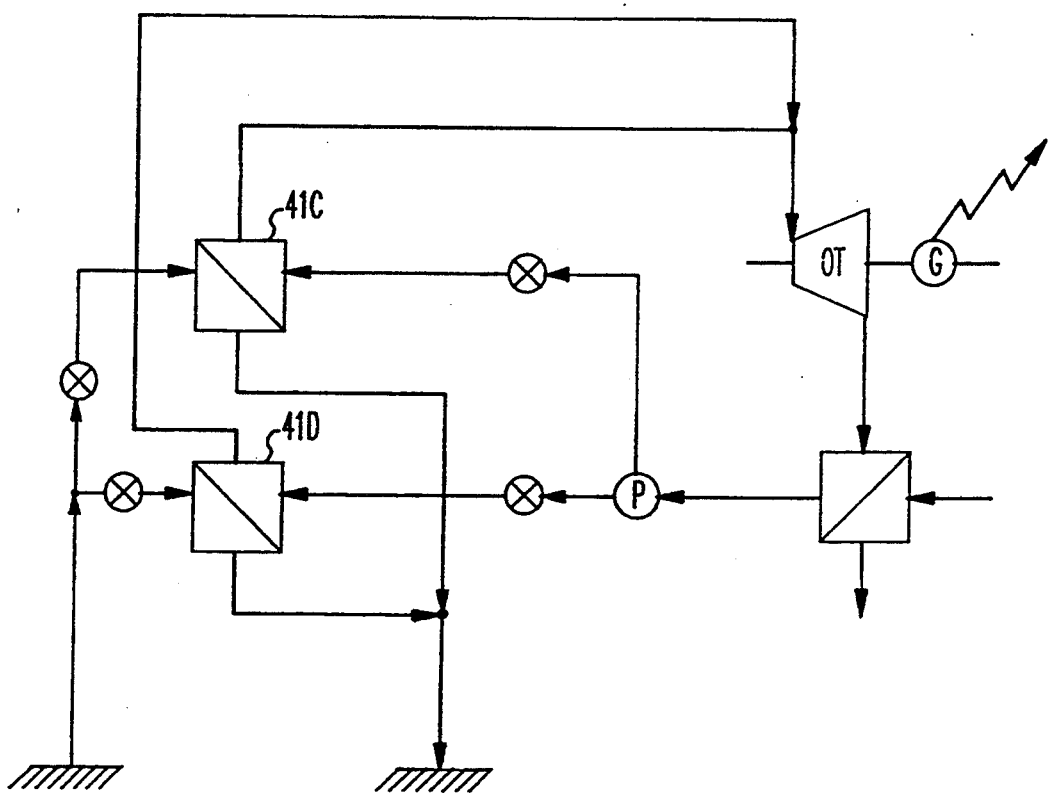
FIG. 2B is a block diagram showing an embodiment of the invention in which the heat exchange means comprises a plurality of indirect heat exchangers connected in parallel.

This two phase geothermal fluid is applied to indirect heat exchanger means shown as indirect heat exchanger 41 containing an organic fluid such as pentane, or isopentane. The indirect heat exchange means may comprise a single indirect heat exchanger as shown in FIG. 2, or a plurality of indirect heat exchangers (41A, 41B, 41C, 41D) which may be connected in series or parallel as shown in FIGS. 2A and 2B respectively. Heat is transferred from the two-phase fluid to the organic fluid thereby vaporizing the same, and the cooled two-phase fluid is conducted to re-injection well 24B at a pressure not significantly below the pressure in heat exchanger 41. Because the pressure of the geothermal fluid loop, from well 12B to well 24B, is maintained in the face of a temperature drop, dissolved minerals remain in solution preventing the build-up of precipitates inside the heat exchanger as explained above.

Vaporized organic fluid produced by heat exchanger 41 is applied to organic vapor turbine coupled to generator 43. In the turbine, the organic vapors expand causing the turbine to drive generator 43 which produces electricity, and are eventually exhausted at 46 to condenser 44. The expanded organic vapor exhausted from turbine 42 is condensed in condenser 44 to a liquid that is returned by pump 45 to heat exchanger 41 to complete the cycle.

Figure 3A:
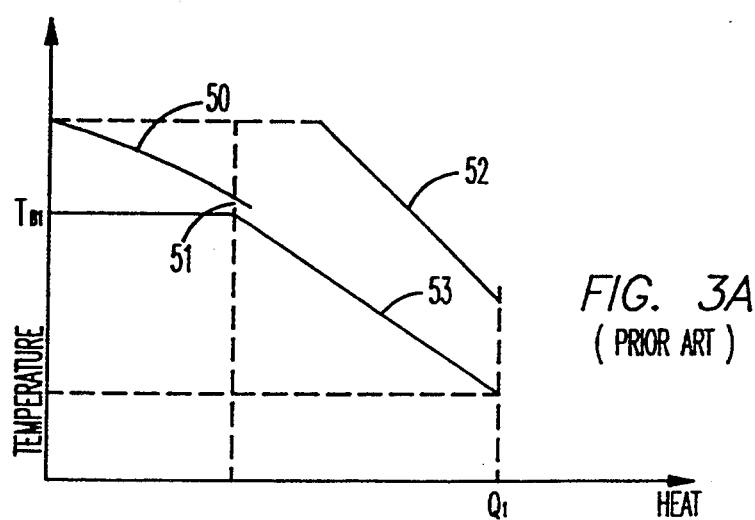
FIG. 3A is a temperature-heat diagram for the configuration shown in FIG. 1.

As indicated above, one of the advantages of this arrangement is its ability to maintain dissolved minerals in solution thereby significantly reducing maintenance of the heat exchanger. Another advantage lies in the ability of the power plant, under equivalent conditions, to generate more power. This is illustrated by a comparison of FIGS. 3A, 3B and 3C. FIG. 3A represents a temperature-heat diagram for a conventional two-phase geothermal fluid power plant of the type shown in FIG. 1, for example. As indicated in FIG. 3A, curve 50 represents the variation in temperature of the geothermal fluid as the steam vaporizes the organic fluid in heat exchanger 20 of FIG. 1. The pinch point at 51 must have minimum value for proper operation; and the curvature of the curve 50 is such that boiling point $T_{B1}$ must be significantly lower than the temperature of the geothermal fluid entering the heat exchanger.

The brine enters heat exchanger 22 at the temperature of the geothermal fluid entering heat exchanger 20 and is cooled along line 52. The temperature of the organic fluid increases along curve 53 as the geothermal fluid cools following line 52. The result is that $Q_1$, the heat extracted from the geothermal fluid by the organic fluid, produces a certain amount of work.

Figure 3B:
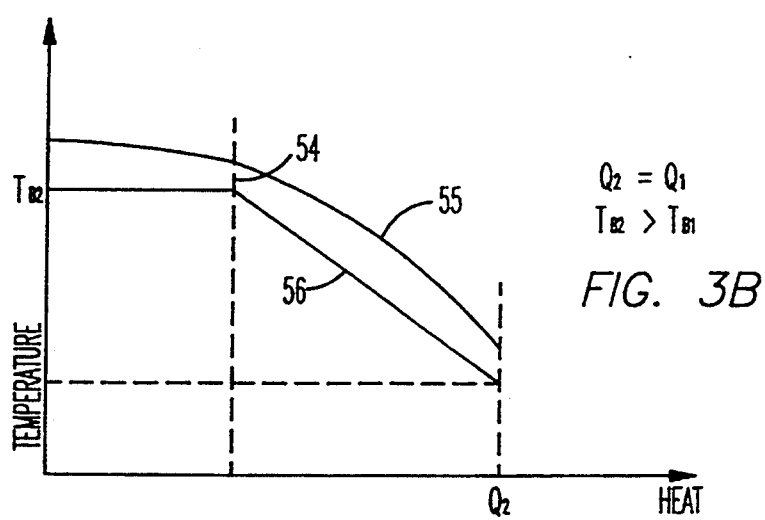
FIGS. 3B and 3C are temperature-heat diagrams for two modes of operation of the present invention shown in FIG. 2.

FIG. 3B shows a temperature-heat diagram for the invention shown in FIG. 2. In this case, the endpoint $Q_2$ is the same as that shown in FIG. 3A, but the boiling point of the geothermal fluid in FIG. 3B, namely $T_{B2}$ is higher than $T_{B1}$ shown in FIG. 1. This situation results because of the shapes of the curve 55, which represents the cooling of the geothermal fluid passing through the indirect heat exchange means shown as heat exchanger 41 in FIG. 2, and curve 56, which represents the preheating of the organic fluid and its boiling in the indirect heat exchange means. The higher boiling temperature $T_{B2}$ results in higher cycle efficiency and thus higher power production from the same heat source.

Figure 3C:
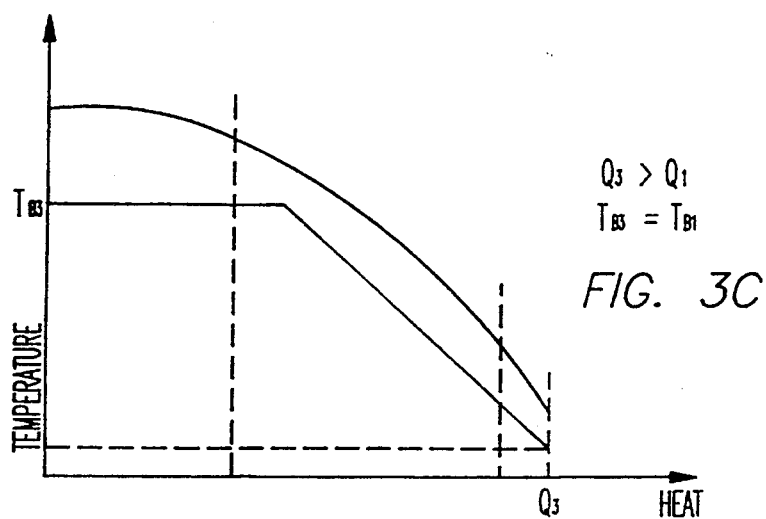

FIG. 3C is a variation of FIG. 3B wherein the endpoint, $Q_3$, is greater than $Q_1$ shown in FIG. 3A, but the boiling temperature $T_{B3}$ is the same $T_{B1}$ while the pinch point is substantially the same as the pinch point in FIG. 3B. In this case, while the efficiency of a power plant operating under the conditions shown in FIG. 3C will be the same as a power plant operating under the conditions shown in FIG. 3A, the amount of work produced by a power plant operating under the conditions shown in FIG. 3C will be greater than the amount of work produced when the plant is operated under the conditions shown in FIG. 3A because more heat is used in the binary cycle power plant system operating under the conditions shown in FIG. 3C.

In addition, a combination of both alternatives shown in FIGS. 3B and 3C can be used. In such case, more power is produced compared to a system or power plant of the type shown in FIG. 3A where the geothermal fluid is separated into its steam and brine components.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for generating power from a two-phase geothermal fluid containing a substantial amount of non-condensable gases without separating the geothermal fluid into its two phases, said method comprising the steps of:
   a) extracting said geothermal fluid from the ground under its own pressure to form extracted geothermal fluid containing said non-condensable gases in gaseous form;
   b) passing the extracted geothermal fluid through an indirect heat exchange means containing an organic fluid for vaporizing the latter and producing vaporized organic fluid and heat depleted geothermal fluid whose cooling curve is characterized by a relatively broad range of temperatures;
   c) expanding the vaporized organic fluid in a turbine coupled to a generator for producing power and expanded vaporized organic fluid; and
   d) condensing said expanded vaporized organic fluid to a liquid;
   e) returning said liquid to said indirect heat exchange means.

2. A method according to claim 1 wherein the extracted geothermal fluid passes through said indirect heat exchange means without being externally pressurized.

3. A method according to claim 1 wherein the extracted geothermal fluid passes through said indirect heat exchange means into a re-injection well without being externally pressurized.

4. A method according to claim 1 wherein the substantial amount of non-condensable gases is not less than about 3%.

5. Apparatus for generating power from a two phase geothermal fluid containing a substantial amount of non-condensable gases without separating the geothermal fluid into its two components, said apparatus comprising:
   a) a production well for producing an extracted two-phase geothermal fluid containing steam, brine and a substantial amount of gaseous non-condensable gases;
   b) an indirect heat exchanger containing an organic fluid for receiving said extracted geothermal fluid and producing vaporized organic fluid and heat depleted geothermal fluid whose cooling curve is characterized by a relatively broad range of temperatures;
   c) an organic vapor turbine for expanding said vaporized organic fluid and producing power and expanded organic vapor;
   d) means for condensing said organic vapor to a liquid; and
   e) means for returning said liquid to said indirect heat exchange means.

6. Apparatus according to claim 5 wherein said extracted geothermal fluid is passed through said indirect heat exchanger means without externally pressurizing said geothermal fluid.

7. Apparatus according to claim 4 including means for passing said-extracted geothermal fluid through said indirect heat exchange means into a rejection well without externally pressurizing said geothermal fluid.

8. Apparatus according to claim 5 wherein the substantial amount of non-condensable gases is not less than about 3%.

* * * * *